H. J. WILLIAMS.
COUPLING FOR MINING CARS.
APPLICATION FILED MAY 4, 1918.

1,278,541.

Patented Sept. 10, 1918.

Witnesses

Inventor
H. J. Williams

By Victor J. Evans
Attorney

UNITED STATES PATENT OFFICE.

HOPKIN J. WILLIAMS, OF NANTICOKE, PENNSYLVANIA.

COUPLING FOR MINING-CARS.

1,278,541.  Specification of Letters Patent.  Patented Sept. 10, 1918.

Application filed May 4, 1918. Serial No. 232,534.

*To all whom it may concern:*

Be it known that I, HOPKIN J. WILLIAMS, a citizen of the United States, residing at Nanticoke, in the county of Luzerne and State of Pennsylvania, have invented new and useful Improvements in Couplings for Mining-Cars, of which the following is a specification.

This invention relates to improvements for couplings for cars such as are used in mines, the object of the invention being to provide improved coupling devices of this character embodying hooks and means to prevent casual detachment of the hooks and also embodying means to coact with and strengthen hooks and thereby prevent them from breaking under stress as when the cars are on heavy grades.

With the above and other objects in view, the invention consists in the construction, combination and arrangement of devices hereinafter described and claimed.

In the accompanying drawings:—

Figure 1:
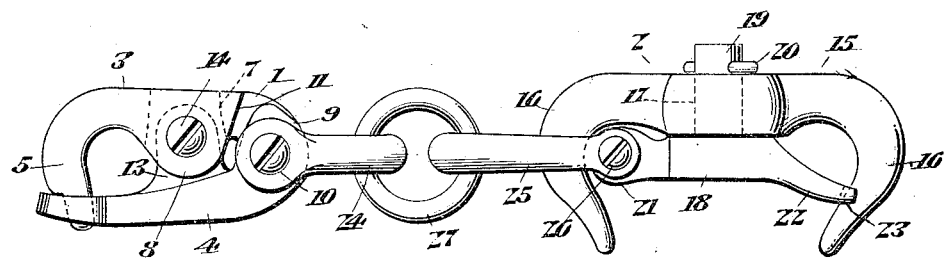
Figure 1 is an elevation, partly in section, of a mining car coupling constructed in accordance with my invention.
Figure 2:
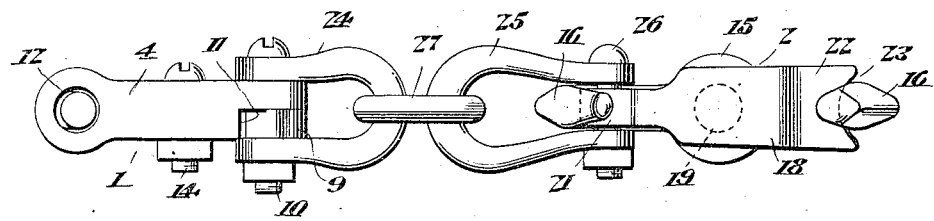
Fig. 2 is a plan of the same.

In the embodiment of my invention, coupling elements 1, 2 are provided for attachment to the draft elements of the cars to be coupled. The coupling element 1 comprises members 3, 4. The member 3 is provided at one end with a hook 5 to engage the draft element of one of the cars and is provided at the opposite end with an arm 6. A slot 7 is provided in the center of the member 3 and at opposite sides of the slot are lugs 8, said lugs, said hook and said arm extending from the same side of the member 3.

The member 4 has a curved arm 9 which is pivotally connected to the arm 6 of the member 3 by a bolt 10, the arms 6, 9 being respectively provided with stop surfaces or shoulders 11 which limit the pivotal movement of the member 4. Said member 4 has an opening 12 near its free end to receive the point of the hook 5 and said member is also provided, at a point near the center, with an arm 13 which is arranged to enter the slot 7 and between the lugs 8. When the hook has been engaged with the draft element of a car and the member 4 has been closed against the member 3 so that the point of the hook 5 is in the opening 12, the arm 13 is arranged in the slot 7 and a pivot bolt 14 is then passed through registering openings in said lugs and said arm 13 so that the element 1 is locked in closed and engaged position and cannot become casually detached. The element 2 comprises a member 15 which has hooks 16 at opposite ends and a central opening 17, and also comprises a member 18 which is arranged between the hooks and has a pivot stud 19 near its center, which stud is engaged pivotally in the opening 17 and is held in place by means of a cross pin 20. Hence, the member 18 is pivotally connected to the member 15 and may be turned therein. The member 18 has a head 21 at one end to bear against the inner side of either of the hooks 16 and is provided at the opposite end with an arm 22 which is notched as at 23 at its free end so that said arm can be sprung into engagement with the other hook 16 to cause said hook to engage in the notch of said arm and thereby lock the member 18 against pivotal movement.

There is a slight degree of elasticity in the member 18 and in the hooks 16 which permits the arm 22 to be snapped into engagement with either of the hooks.

A clevis 24 is pivoted on the bolt 10 of the element 1. A clevis 25 is pivotally connected to the member 18 of the element 2 by a bolt 26 and the said clevises are connected together by a ring or link 27 so that a flexible connection is provided between the coupling elements 1, 2. It will be observed that the stress on the member 18 is distributed to the hook 16 of the member 15 so that danger of breaking the coupling is minimized. It will be also understood that neither of the coupling elements can become casually disengaged from the draft element of a car and hence the cars will not become casually uncoupled.

My improved coupling devices are safe, extremely strong and durable, and are not likely to get out of order.

While I have herein shown and described a preferred embodiment of my invention, I would have it understood that changes may be made in the form, proportion and construction of the several parts, without departing from the spirit of my invention, and within the scope of the appended claim.

Having thus described my invention, I claim:—

A coupling element comprising a member having a hook at one end, an arm at the opposite end and also having a central opening, and a second member pivotally connected at one end to said arm and having an opening near the free end for the reception of the hook, said second member also having an arm to engage in the opening of the first named member and means to secure said members together in closed relation.

In testimony whereof I affix my signature.

HOPKIN J. WILLIAMS.

Copies of this patent may be obtained for five cents each, by addressing the "Commissioner of Patents, Washington, D. C."